(12) United States Patent
Shi et al.

(10) Patent No.: US 9,240,633 B2
(45) Date of Patent: Jan. 19, 2016

(54) TUNABLE WIRELESS POWER DEVICE

(75) Inventors: Guining Shi, San Diego, CA (US); Sreenivas Kasturi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/031,017

(22) Filed: Feb. 18, 2011

(65) Prior Publication Data

US 2011/0291490 A1    Dec. 1, 2011

Related U.S. Application Data

(60) Provisional application No. 61/349,728, filed on May 28, 2010.

(51) Int. Cl.

| H01F 27/42 | (2006.01) |
|---|---|
| H01Q 1/52 | (2006.01) |
| H01Q 1/22 | (2006.01) |
| H01Q 7/00 | (2006.01) |
| H02J 7/02 | (2006.01) |
| H04B 5/00 | (2006.01) |

(52) U.S. Cl.
CPC . *H01Q 1/52* (2013.01); *H01Q 1/22* (2013.01); *H01Q 7/00* (2013.01); *H02J 7/025* (2013.01); *H04B 5/0037* (2013.01); *H04B 5/0081* (2013.01)

(58) Field of Classification Search
CPC ....................................................... H01F 27/42
USPC .......................................................... 307/104
See application file for complete search history.

(56) References Cited

U.S. PATENT DOCUMENTS

| 5,940,043 | A | * | 8/1999 | Canipe | ............... | H01Q 1/22 343/742 |
|---|---|---|---|---|---|---|
| 2006/0214003 | A1 | * | 9/2006 | Morrow et al. | ............... | 235/487 |
| 2007/0090790 | A1 | * | 4/2007 | Hui | ............... | H01F 17/0006 320/108 |
| 2009/0127937 | A1 | * | 5/2009 | Widmer | ............... | H02J 5/005 307/149 |
| 2010/0201596 | A1 | * | 8/2010 | Mieslinger | ............... | G06K 19/07749 343/841 |
| 2010/0277121 | A1 | * | 11/2010 | Hall | ............... | B60L 11/182 320/108 |
| 2011/0068178 | A1 | * | 3/2011 | Gebhart | ............... | G06K 19/07749 235/492 |

FOREIGN PATENT DOCUMENTS

| EP | 0590589 | A1 |  | 4/1994 |  |  |
|---|---|---|---|---|---|---|
| EP | 1347533 | A1 |  | 9/2003 |  |  |
| EP | 1484816 | A1 |  | 12/2004 |  |  |
| EP | 1484816 | A1 | * | 12/2004 | ......... | G06K 7/10336 |

OTHER PUBLICATIONS

International Search Report and Written Opinion—PCT/US2011/038239, ISA/EPO—Sep. 2, 2011.

* cited by examiner

*Primary Examiner* — Rexford Barnie
*Assistant Examiner* — Joseph Inge
(74) *Attorney, Agent, or Firm* — Knobbe Martens Olson & Bear, LLP

(57) ABSTRACT

Exemplary embodiments are directed to wireless power devices. A device may include a transmit antenna and a metallic structure spaced from and configured for detuning the transmit antenna. The device may further include a circuit for tuning the transmit antenna.

18 Claims, 12 Drawing Sheets

TUNABLE WIRELESS POWER DEVICE

CLAIM OF PRIORITY UNDER 35 U.S.C. §119

This application claims priority under 35 U.S.C. §119(e) to:

U.S. Provisional Patent Application No. 61/349,728 entitled "PRE-DETUNING A WIRELESS POWER ANTENNA SYSTEM" filed on May 28, 2010, the disclosure of which is hereby incorporated by reference in its entirety.

BACKGROUND

1. Field

The present invention relates generally to wireless power, and more specifically, to a wireless power device for transmitting wireless power.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be appreciated by a person having ordinary skill in the art, a transmit antenna of a wireless power device may be detuned by an external metal structure, which is positioned proximate the transmit antenna. Accordingly, the efficiency of wireless power transfer between the wireless power device and a receiver may be decreased. A need exists for methods, systems, and devices for enhanced wireless power transfer. More specifically, a need exists for methods, systems, and devices for a wireless power device with enhanced immunity to detuning caused by external structures.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors. Hereafter, all three of this will be referred to generically as radiated fields, with the understanding that pure magnetic or pure electric fields do not radiate power. These must be coupled to a "receiving antenna" to achieve power transfer.

Figure 1:
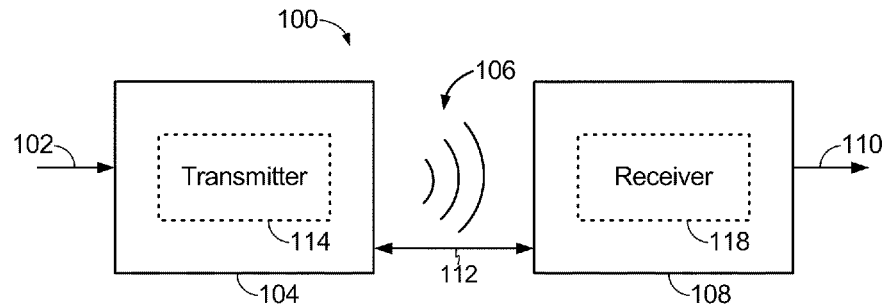
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
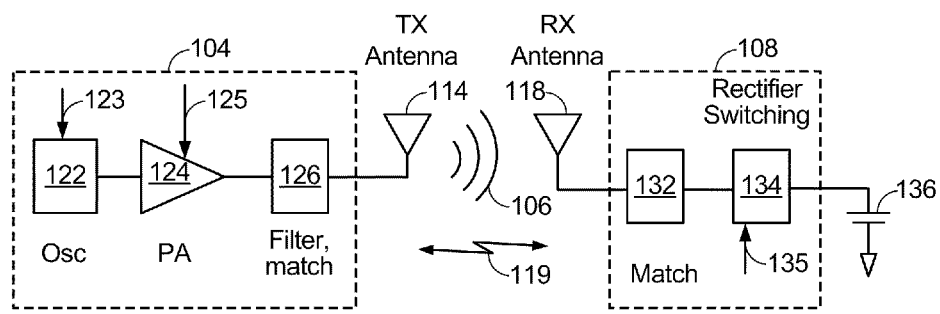
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 468.75 KHz, 6.78 MHz or 13.56 MHz, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
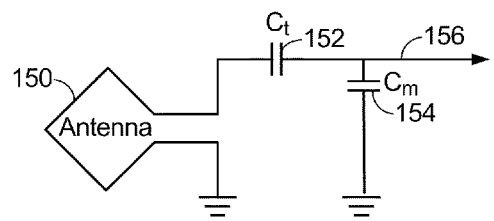
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
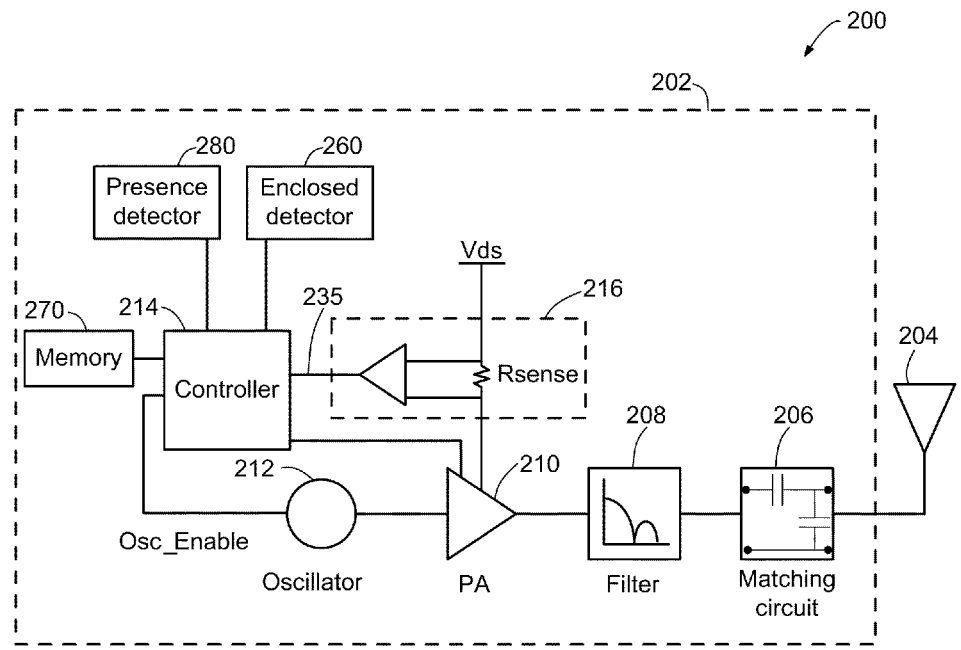
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 260, or a combination thereof, connected to the controller 214 (also referred to as a processor herein). The controller 214 may adjust an amount of power delivered by the amplifier 210 in response to presence signals from the presence detector 280 and the enclosed detector 260. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 260 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
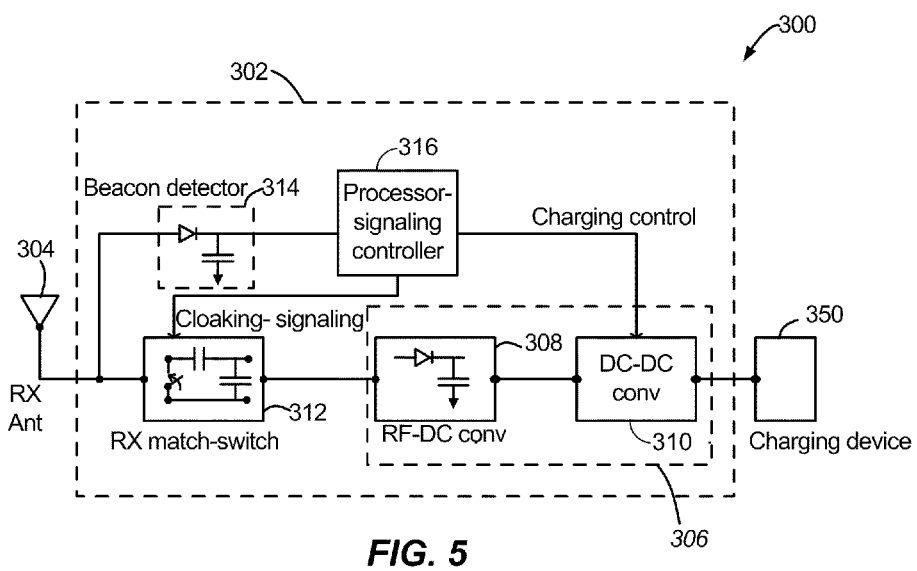
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Exemplary embodiments, as described herein, relate to a wireless power device including a transmit antenna and a metallic structure spaced from the transmit antenna. Further, in accordance with an exemplary embodiment, the transmit antenna and the metallic structure may be integrated within a transmitter. According to one exemplary embodiment, the metallic structure may induce eddy currents to detune the transmit antenna. The wireless power device may further include a matching circuit for retuning the transmit antenna in the presence of the metallic structure. Accordingly, when the wireless power device is placed close to an external metallic structure, such as a table, it may exhibit enhanced immunity to further detuning According to one exemplary embodiment, the wireless power device may further include a magnetic structure positioned between the transmit antenna and the metallic structure.

Figure 6:
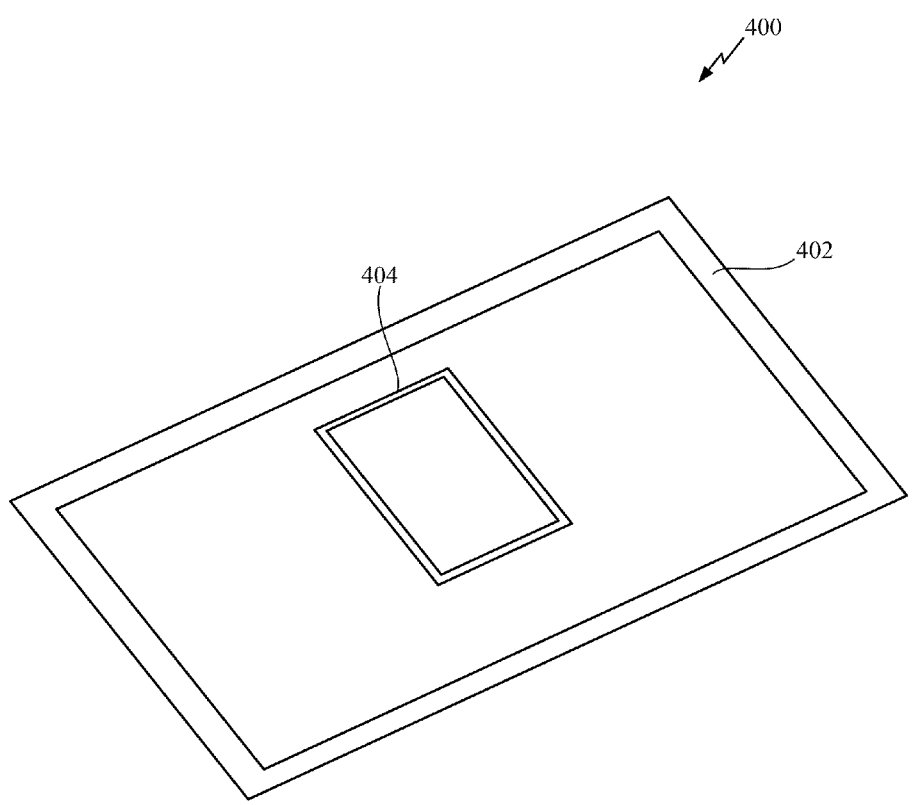
FIG. 6 illustrates a conventional wireless charging system including a transmit antenna and a receive antenna.
Figure 7:
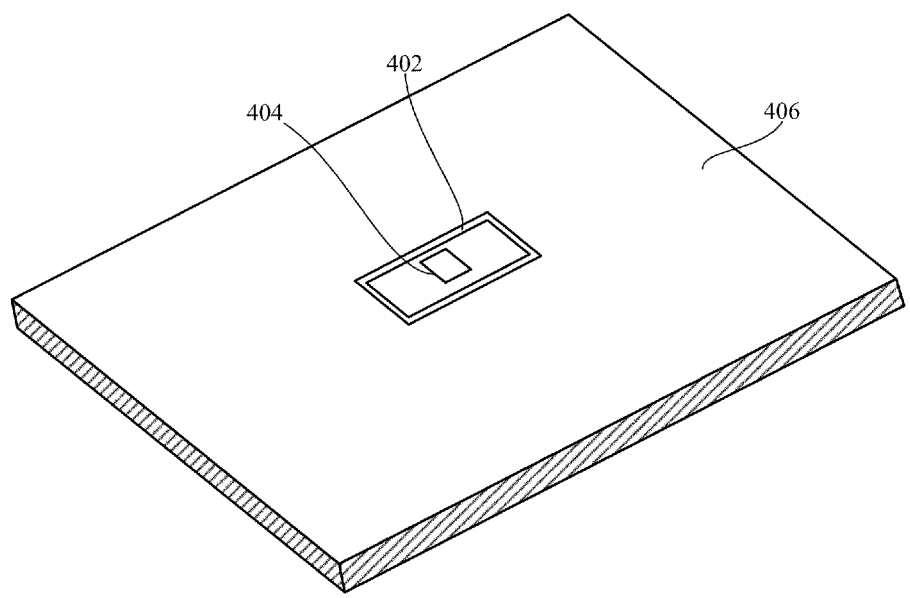
FIG. 7 illustrates a conventional charging system adjacent an external metallic structure.
Figure 8:
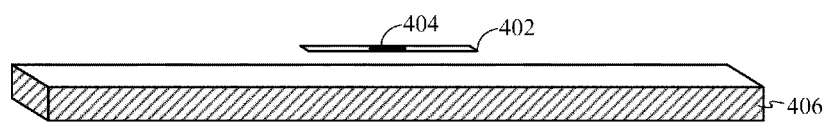
FIG. 8 is a side view of a conventional charging system adjacent an external metallic structure.

FIG. 6 illustrates a wireless power system 400 including a wireless transmit antenna 402 and a wireless receive antenna 404 positioned within a charging region of transmit antenna 402. As will be appreciated by a person having ordinary skill in the art, transmit antenna 402 may be integrated within a device, such as a wireless charger, and receive antenna 404 may be integrated in an electronic device, such as a mobile telephone. As a non-limiting example, the transfer efficiency of wireless power system 400 (i.e., between transmit antenna 402 and receive antenna 404) may be approximately 81%. FIG. 7 illustrates wireless receive antenna 404 positioned within a charging region of transmit antenna 402. Furthermore, in FIG. 7, transmit antenna 402 is positioned proximate a metallic structure 406, which may comprise, for example only, a metal table. FIG. 8 is a side view of transmit antenna 402, receive antenna 404, and metallic structure 406.

As will be appreciated by a person having skill in the art, transmit antenna 402 may be undesirably detuned upon being positioned on or close to metallic structure 406. The degree of detuning depends on the dimensions of metallic structure 406 and spacing between transmit antenna 402 and metallic structure 406. The detuning may cause a portion of the power injected into transmit antenna 402 to be reflected back to a power amplifier (e.g., a power amplifier 124 of FIG. 2) associated with transmit antenna 402, resulting in poor power transfer efficiency, and potentially impacting the functionality of the power amplifier. The magnetic field caused by this eddy current may cancel a portion of the magnetic field generated by transmit antenna 402. Accordingly, distributed parameters, such as self inductance and mutual inductance of transmit antenna 402 and receive antenna 404 may change, and transmit antenna 402 may be detuned relative to receive antenna 404. As a non-limiting example, the transfer efficiency of a wireless power system positioned proximate an external metallic structure (e.g., metallic structure 406) may be approximately 6.8%.

Figure 9:
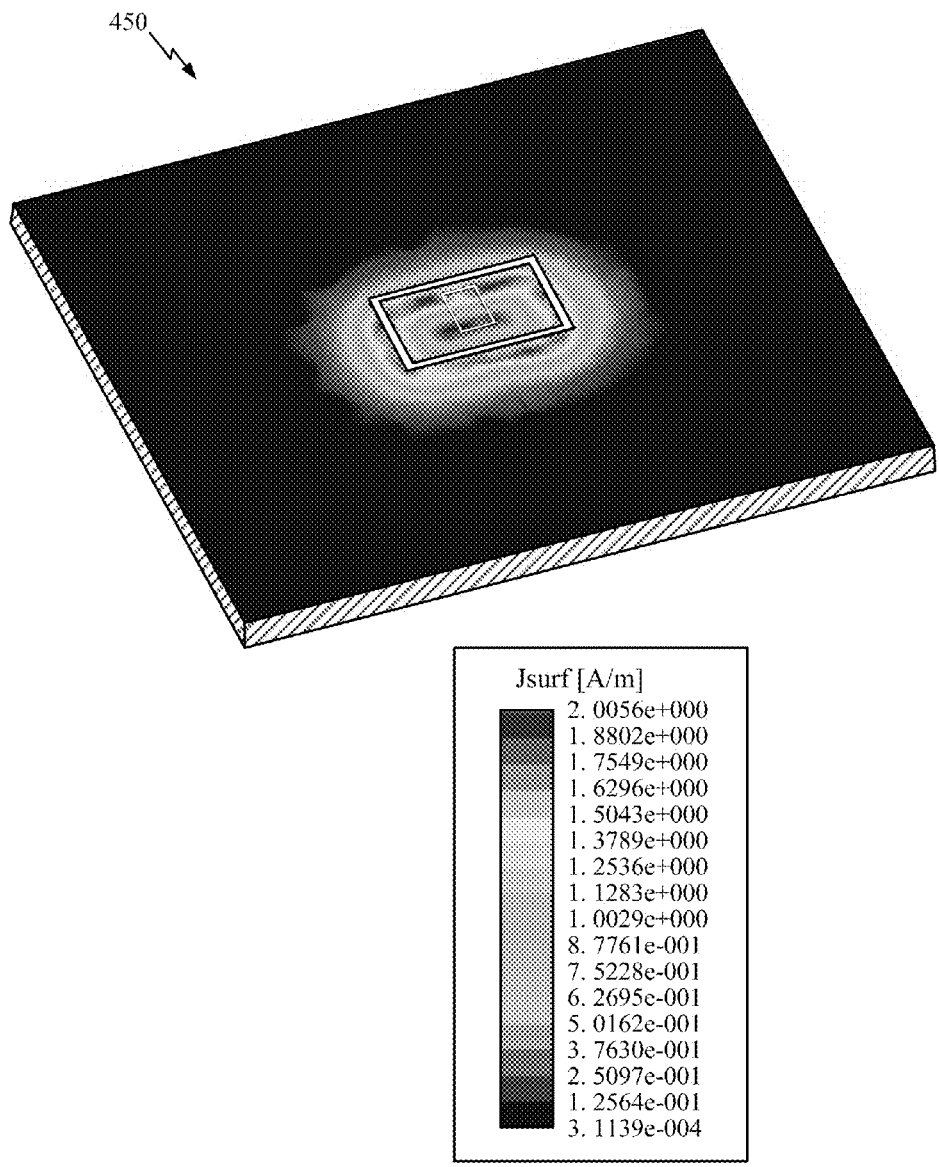
FIG. 9 is a grayscale plot illustrating eddy current intensity of a conventional wireless charging system.

FIG. 9 is a grayscale plot 450 illustrating intensity of eddy currents induced on metallic structure 406. As illustrated in FIG. 9, the areas proximate transmit antenna 402 have a higher intensity of induced eddy currents than other areas.

Figure 10A:
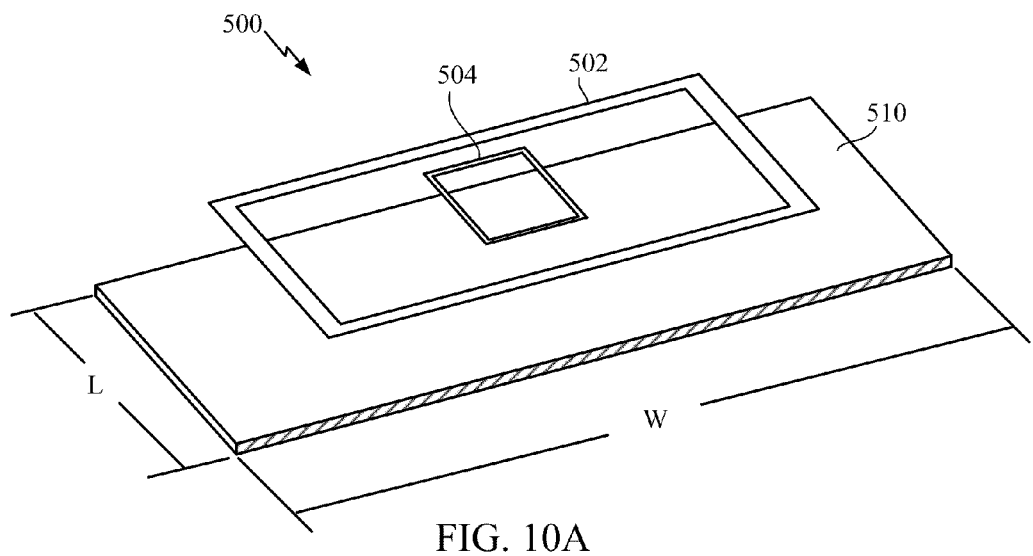
FIG. 10A illustrates a wireless charging system including a transmit antenna and a metallic structure, in accordance with an exemplary embodiment of the present invention.
Figure 10B:
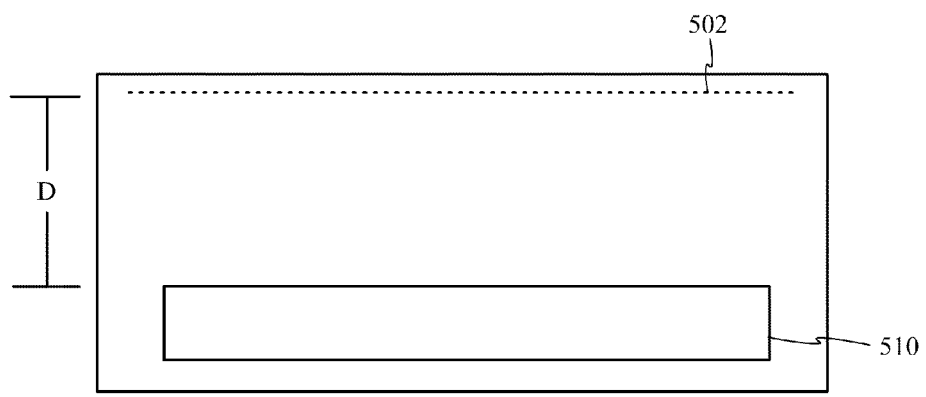
FIG. 10B is a side view of a wireless charging system including a transmit antenna and a metallic structure, according to an exemplary embodiment of the present invention.

FIG. 10A illustrates a system 500 including a transmit antenna 502 and a receive antenna 504. Furthermore, in accordance with an exemplary embodiment of the present invention, system 500 includes a metallic structure 510, which is spaced from transmit antenna 502. Metallic structure 510 may also be referred to herein as a "detuning device." Metallic structure 510 may be any suitable shape and size, and a size of metallic structure 510 may depend on a size of transmit antenna 502. For example, metallic structure 510 may have a circular shape, a square shape, or a rectangular shape. As a non-limiting example, metallic structure 510 may have a width W of substantially 350 millimeters and a length L of substantially 200 millimeters. Further, with reference to FIG. 10B, metallic structure 510 and transmit antenna 502 may be separated by a distance D, which may be in the range of, for example only, 20 to 33 millimeters. It is noted that transmit antenna 502 and metallic structure 510 may be integrated within a wireless power device. As a more specific example, transmit antenna 502 and metallic structure 510 may be integrated within a wireless power transmitter. It is noted that although metallic structure 510 is illustrated as being parallel to transmit antenna 502, metallic structure 510 may be oriented in any manner with respect to transmit antenna 502. It is further noted that transmit antenna 502 and metallic structure 510 may be separated by any suitable material or materials. For example, that transmit antenna 502 and metallic structure 510 may be separated by air.

According to one exemplary embodiment, metallic structure 510 may comprise a metal shield. As more specific example, metallic structure 510 may comprise a mesh structure, a shield having one or more slots, or any combination thereof. It is noted that metallic structure 510 may comprise a device having any suitable shape. It is further noted that metallic structure 510 may be physically isolated from transmit antenna 502. Metallic structure 510 may also be physically isolated from any other components (e.g., transmit circuitry) of a transmitter. Stated another way, metallic structure 510 may comprise a floating shield. According to one exemplary embodiment, metallic structure 510 is configured to induce eddy currents, which may detune transmit antenna 502. More specifically, according to Lenz's law, the eddy currents induced by metallic structure 510 create a magnetic field that opposes the change of a magnetic field generated by transmit antenna 502.

In addition, system 500 may be configured for retuning the device in the presence of metallic structure 510. More specifically, for example, system 500 may include a matching circuit (e.g., matching circuit 126 of FIG. 2) for tuning transmit antenna 502 in the presence of metallic structure 510. Accordingly, tuning of transmit antenna 502 is based at least partially on metallic structure 510. It is noted that a matching circuit may be integrated within a wireless power device along with transmit antenna 502 and metallic structure 510. It is further noted that the matching circuit may comprise any suitable, known matching circuit. As a non-limiting example, the transfer efficiency of wireless power system 500 may be approximately 71%.

A detuning device embedded into a wireless power device may help to reduce eddy currents, which are generated by an external metallic structure. Stated another way, the detuning device may shield a transmit antenna of the wireless power device from the external metallic structure. The transmit antenna may be pre-tuned by embedding an "internal" metallic part, and then adjust the matching to accommodate this metallic part. Accordingly, the wireless power device may have "built-in" immunity and, therefore, may exhibit enhanced immunity to "external" metallic structures. As a result, upon system 500 being positioned proximate (e.g., positioned on) a table having a metallic structure, an intensity of the eddy current induced by the table may be limited and, therefore, return loss may be decreased.

Figure 11:
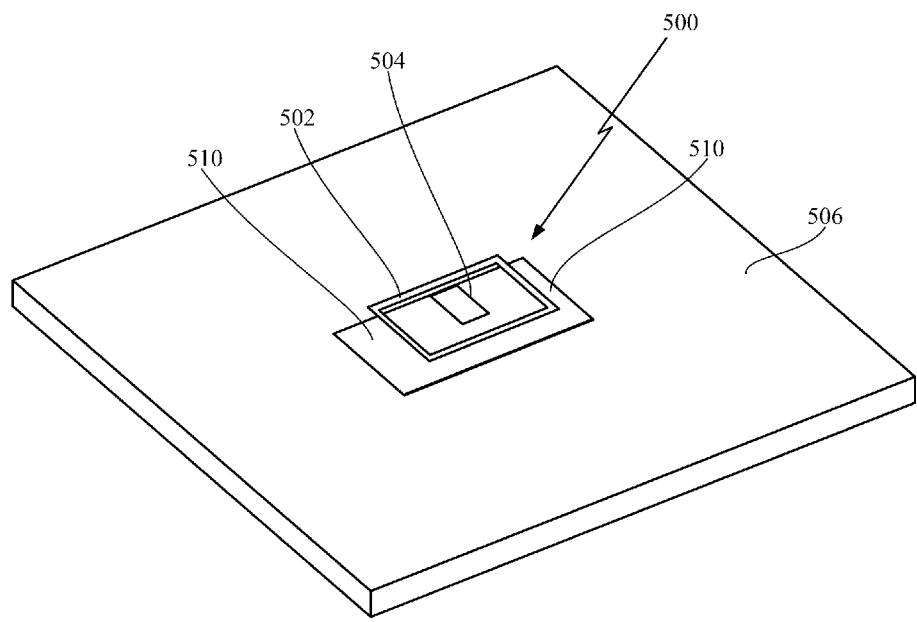
FIG. 11 is a wireless charging system including a transmit antenna and a metallic structure, the charging system positioned proximate an external metallic structure, in accordance with an exemplary embodiment of the present invention.
Figure 12:
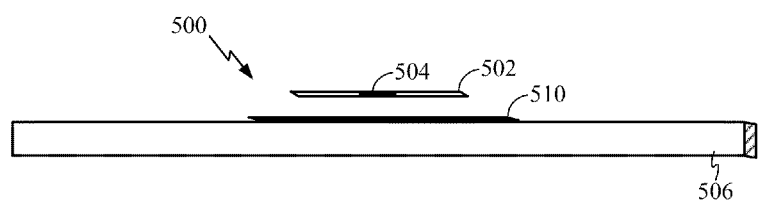
FIG. 12 is a side view of a wireless charging system including a transmit antenna and a metallic structure, the charging system positioned proximate an external metallic structure, according to an exemplary embodiment of the present invention.
Figure 13:
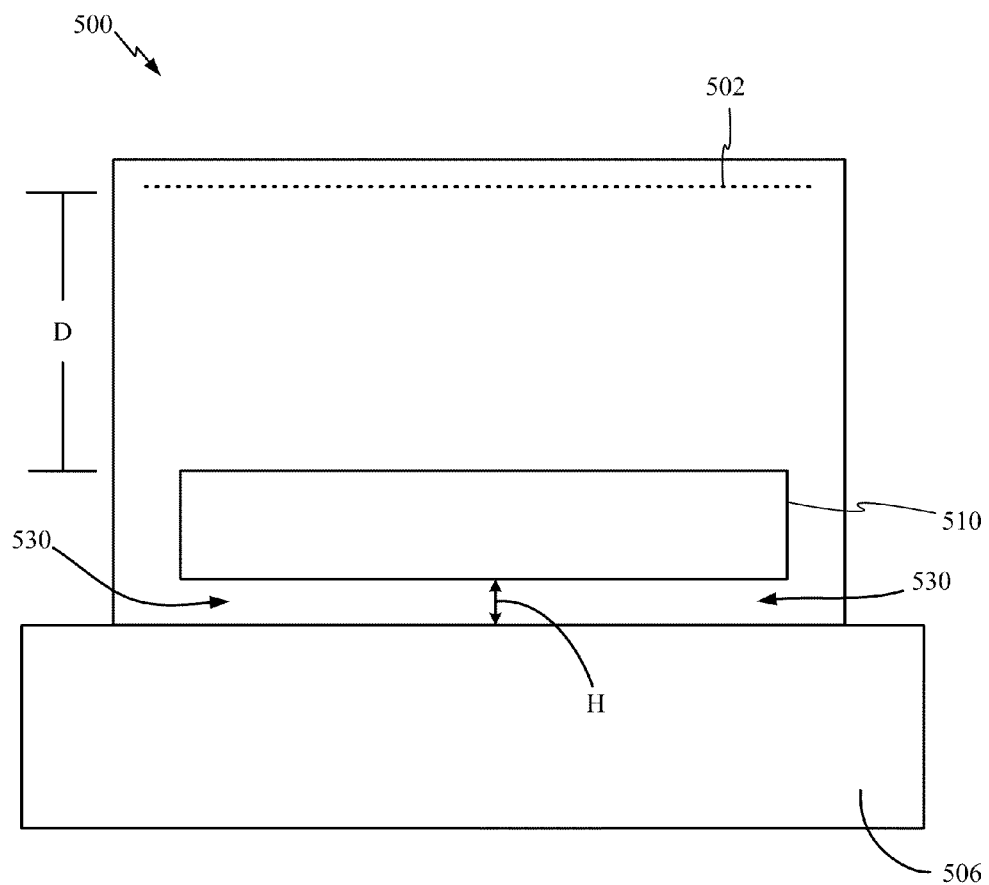
FIG. 13 is another side view of a wireless charging system including a transmit antenna and a metallic structure, the charging system positioned proximate an external metallic structure, according to an exemplary embodiment of the present invention.

FIG. 11 depicts system 500 positioned on an external metallic structure 506. FIG. 12 is a side view of system 500 positioned on metallic structure 506. As non-limiting examples, metallic structure 506 may comprise a table. As illustrated in FIG. 12, metallic structure 510 is spaced from transmit antenna 502. Further, it is noted that a separator 530 (not shown in FIG. 12; see FIG. 13) may exist between detuning device 510 and metallic structure 506. Separator 530, which may have a height H of, for example, substantially 1 millimeter, may comprise any suitable material or air. As a non-limiting example, the transfer efficiency of wireless power system 500 positioned proximate a metallic structure may be approximately 68%.

Figure 14:
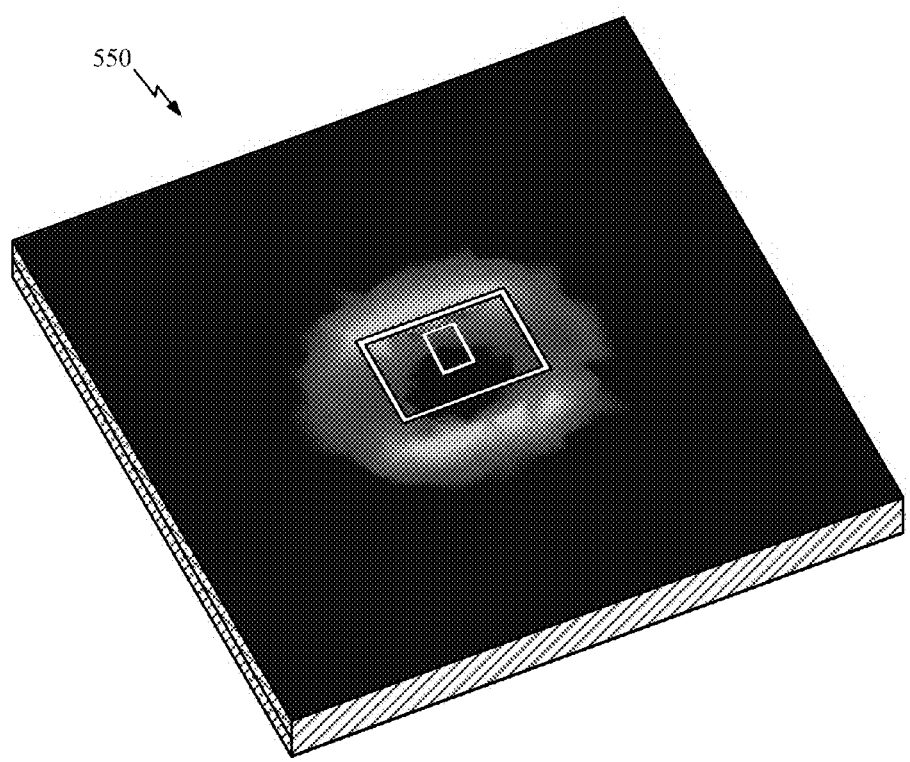
FIG. 14 is a grayscale plot illustrating eddy current intensity of a wireless charging system according to an exemplary embodiment of the present invention.
Figure 14:
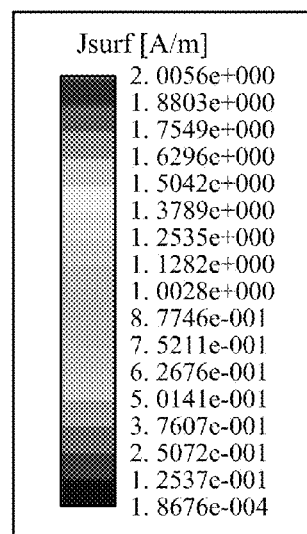

FIG. 14 is a grayscale plot 550 illustrating intensity of eddy currents induced on metallic structure 506 having system 500 positioned thereon. As will be appreciated by a person having ordinary skill in the art, in comparison to grayscale plot 450 illustrated in FIG. 9, the eddy currents of plot 550 are less intense and, as a result, the efficient of system 500 may be increased relative to system 400.

Figure 15:
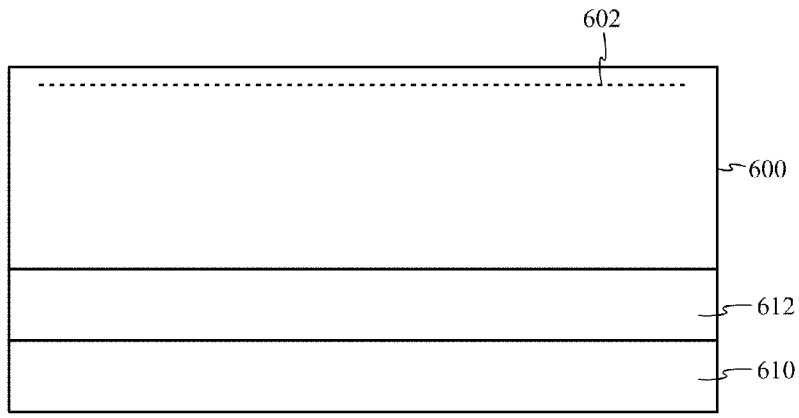
FIG. 15 depicts a wireless power device including a transmit antenna, a metallic structure, and a magnetic material, in accordance with an exemplary embodiment of the present invention.
Figure 16:
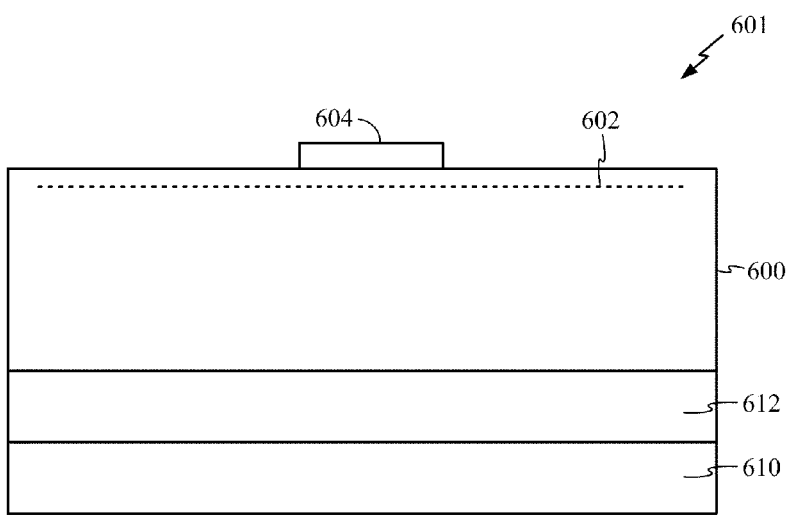
FIG. 16 depicts a wireless power system including the wireless power device of FIG. 15.

FIG. 15 depicts a wireless power device 600, according to an exemplary embodiment of the present invention. Wireless power device 600 includes a transmit antenna 602 proximate a surface of device 600 and a metallic structure 610 spaced from transmit antenna 602. It is noted that metallic structure 610 may comprise metallic structure 510 described above. Wireless power device 600 further includes a magnetic material 612 positioned between transmit antenna 602 and metallic structure 610. As one example, magnetic material 612 may comprise a ferrite sheet. As another example, magnetic material 612 may comprise a flexible, magnetic sheet. FIG. 16 depicts a system 601 including a wireless power receiver 604, which includes a wireless receive antenna (not shown), positioned on a charging surface of wireless power device 600.

It is noted that a detuning device (e.g., metallic structure 510) may reduce the power efficiency of a wireless power system in the absence of an external metallic structure, such as a table. However, a wireless power system including a detuning device within a wireless power device may enhance immunity to further detuning caused by an external metallic structure proximate the wireless power device.

Figure 17:
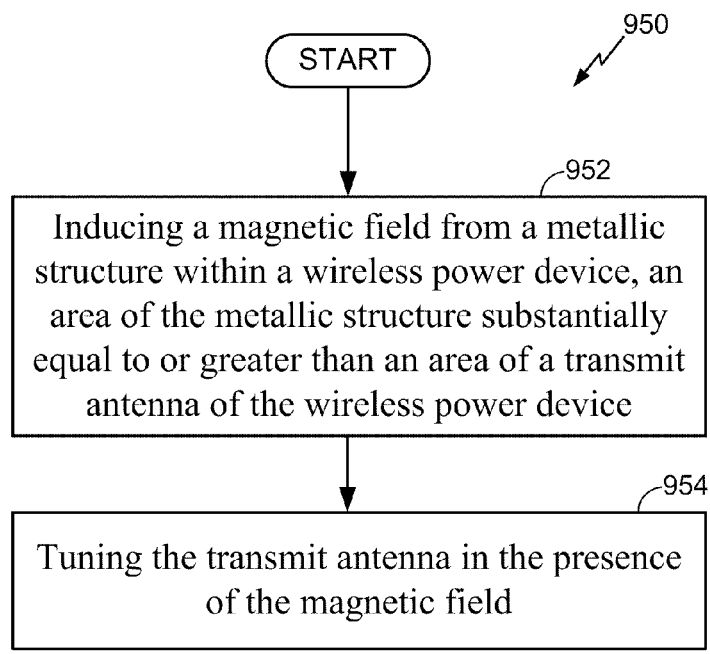
FIG. 17 is a flowchart illustrating a method, in accordance with an exemplary embodiment of the present invention.

FIG. 17 is a flowchart illustrating a method 950, in accordance with one or more exemplary embodiments. Method 950 may include inducing a magnetic field from a metallic structure within a wireless power device, an area of the metallic structure substantially equal to or greater than an area of a transmit antenna of the wireless power device (depicted by numeral 952). Method 950 may further include tuning the transmit antenna in the presence of the magnetic field (depicted by numeral 954).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device for providing wireless power, comprising:
   a transmit antenna configured to wirelessly transmit power via a magnetic field at a level sufficient to power or charge a chargeable device;
   a metallic structure spaced at a non-zero distance and physically isolated from the transmit antenna, and configured to:
      induce eddy currents to detune the transmit antenna, the eddy currents creating a magnetic field that opposes a change in the magnetic field generated by the transmit antenna, and
      shield the transmit antenna from another metallic structure to reduce eddy currents generated in the other metallic structure;
   a magnetic material positioned between the transmit antenna and the metallic structure; and
   a circuit configured to tune the transmit antenna in the presence of the metallic structure, the transmit antenna, the metallic structure, the magnetic material and the circuit integrated together.

2. The device of claim 1, the metallic structure comprising a metal sheet.

3. The device of claim 1, the metallic structure and the transmit antenna being separated by a distance within a range of substantially 20 to 33 millimeters.

4. The device of claim 1, the magnetic material comprising a ferromagnetic structure.

5. The device of claim 1, further comprising a separator positioned between the metallic structure and an external surface of the device.

6. The device of claim 5, the separator having a height of substantially 1 millimeter.

7. The device of claim 1, the metallic structure having one of a rectangular shape, a square shape, or a circular shape.

8. A method for providing wireless power, comprising:
   inducing eddy currents in a metallic structure within a wireless power device to detune a transmit antenna, the eddy currents creating a magnetic field that opposes a change in the magnetic field generated by the transmit antenna, an area of the metallic structure substantially equal to or greater than an area of the transmit antenna, the transmit antenna spaced at a non-zero distance and physically isolated from the metallic structure;
   shielding the transmit antenna via the metallic structure from another metallic structure to reduce eddy currents generated in the other metallic structure; and
   tuning the transmit antenna in the presence of the magnetic field and in the presence of a magnetic material proximate the metallic structure.

9. The method of claim 8, the tuning comprising tuning the transmit antenna in the presence of the metallic structure separated from the transmit antenna a distance within a range of substantially 20 to 33 millimeters.

10. The method of claim 8, the tuning comprising tuning the transmit antenna with a matching circuit.

11. The method of claim 8, the inducing eddy currents in the metallic structure comprises inducing eddy currents in a metallic sheet.

12. The method of claim 8, the tuning the transmit antenna in the presence of the magnetic material comprising tuning the transmit antenna in the presence of a ferromagnetic structure.

13. The method of claim 8, further comprising wirelessly transmitting power at a transfer efficiency of substantially 68% while the wireless power device is positioned proximate the other metallic structure.

14. The method of claim 8, the tuning comprising tuning the transmit antenna in the presence of the metallic structure spaced from a surface of the wireless power device.

15. The method of claim 8, the tuning comprising tuning the transmit antenna in the presence of the metallic structure having one of a rectangular shape, a square shape, and a circular shape.

16. A device for providing wireless power, comprising:
   means for generating a first magnetic field at a level sufficient to power or charge a chargeable device;
   means for inducing eddy currents, the eddy currents creating a second magnetic field that opposes a change of the first magnetic field;
   means for detuning the generating means, the detuning means shielding the generating means from another means for detuning the generating means to reduce eddy currents generated in the other detuning means, the detuning means being spaced a non-zero distance and physically isolated from the generating means; and
   means for tuning the generating means in the presence of a magnetic material proximate the detuning means.

17. The device of claim 16, the means for tuning comprising means for tuning the generating means in the presence of the detuning means separated from the generating means by a distance within a range of substantially 20 to 33 millimeters.

18. The device of claim 1, the metallic structure configured to detune the transmit antenna based at least in part on a distance between the transmit antenna and the metallic structure, the circuit configured to tune the transmit antenna based at least in part on detuning caused by the metallic structure.

* * * * *